United States Patent [19]
Gros et al.

[11] 4,293,935
[45] Oct. 6, 1981

[54] METHOD OF SEISMIC EXPLORATION

[75] Inventors: Pierre Gros, Buc; Jean Millouet, La Celle Saint Cloud; Philippe Staron, Mennecy, all of France

[73] Assignee: Societe Nationale Elf Aquitaine (Production), France

[21] Appl. No.: 916,352

[22] Filed: Jun. 16, 1978

[30] Foreign Application Priority Data

Jun. 30, 1977 [FR] France .................. 77 20098

[51] Int. Cl.³ .................. G01V 1/02; G01V 1/28
[52] U.S. Cl. .................. 367/43; 367/41; 367/49; 367/63; 367/189
[58] Field of Search .......... 340/15.5 TA, 15.5 F; 367/41, 43, 45, 46, 49, 59, 189, 63

[56] References Cited

U.S. PATENT DOCUMENTS

| | | | |
|---|---|---|---|
| 2,696,891 | 12/1954 | Neufeld | 340/15.5 F |
| 3,259,878 | 7/1966 | Mifsud | 340/15.5 TA |
| 3,274,541 | 9/1966 | Embree | 340/15.5 F |
| 3,284,769 | 11/1966 | Skelton | 367/189 |
| 3,292,144 | 12/1966 | Lee et al. | 367/41 |
| 3,332,512 | 7/1967 | Sundt | 340/15.5 TA |
| 3,731,268 | 5/1973 | Landrum, Jr. | 340/15.5 TA |
| 4,004,267 | 1/1977 | Mayne | 340/15.5 TA |
| 4,037,190 | 7/1977 | Martin | 340/15.5 TA |

FOREIGN PATENT DOCUMENTS 1316479  5/1973  United Kingdom .......... 340/15.5 F

*Primary Examiner*—Howard A. Birmiel
*Attorney, Agent, or Firm*—Schwartz, Jeffery, Schwaab, Mack, Blumenthal & Koch

[57] ABSTRACT

Seismic exploration on land and on ocean beds is performed by emitting vibrational acoustic signals of long time-duration within a desired frequency spectrum at one or a number of points, the signals corresponding to the waves received from the reflectors being then processed. The method further consists in forming the complex spectrum of the received signal corresponding to the emitted signal in respect of each frequency band, in forming the complex spectrum of a reference of the emitted signal in respect of each frequency band and in dividing the complex spectrum of the received signal by the complex spectrum of the reference of the emitted signal, at least an external portion of each complex spectrum being eliminated in the case of each complex spectrum.

16 Claims, 5 Drawing Figures

METHOD OF SEISMIC EXPLORATION

BACKGROUND OF THE INVENTION

This invention relates to a method of seismic exploration and more especially to a method which consists in sending into the medium to be explored wave trains made up of acoustic vibrational waves of long duration and having a frequency which is continuously variable between two limiting frequencies, in receiving the emitted signal in at least one receiver or seismograph after reflection from the different reflectors of the medium to be explored, then in processing the signals which have been received and recorded.

The complex amplitude spectrum of the emitted signal is never rectangular as might be expected but on the contrary irregular especially insofar as it extends beyond the limiting frequencies; the term complex is used in the mathematical sense and should accordingly be taken to mean that the spectrum can have real and/or imaginary portions. This phenomenon arises from the fact that the emitted signal is limited in time and therefore contains a finite number of arches.

The emitted signal follows a convolute path within the medium to be explored, with the reflectors which constitute the dioptric elements for the waves which travel within said medium; the received signal which corresponds to the emitted signal is therefore composed of a sum of different signals weighted by the coefficient of reflection of said reflectors, said received signal being displaced with respect to the double time intervals of the path between reflectors.

Processing of the received signals consists in correlating each received signal or recording by the signal which has given rise to this latter. This operation leads to a result equivalent to the convolution of the pulsed final seismogram by the autocorrelation function of the emitted signal. In order to permit of easy differentiation of very closely spaced reflectors, which is the object of the so-called high-resolution seismic exploration technique, the autocorrelation function of the emitted signal must have a central peak which is as narrow as possible.

Moreover, in order to ensure that the image of a reflector is as accurate as possible, said image must not be impaired by effects produced by other reflectors even in remote locations. The result of this is that the correlation residues or noise of the autocorrelation function must necessarily be as small as possible.

As a consequence of the foregoing, it is essential to take certain precautions at the time of emission on the amplitude spectra of the emitted signals: a high-resolution signal must have an amplitude spectrum which is more spread-out than a medium-resolution signal and a signal having low correlation noise must exhibit an amplitude spectrum having a higher degree of "smoothness" or "uniformity" than a signal having high correlation noise.

In the vibrational method, it is possible to modify the shape of the spectrum of frequencies emitted either at the time of emission or after reception at the time of the correlation operation or by means of any other suitable operation. Should it be desired to produce action on the shape of the spectrum of frequencies emitted after reception, however, the signal-to-noise ratio must be sufficiently good to ensure that a noise is not unduly amplified when the amplitudes of certain frequencies of the received signal are amplified.

One proposed improvement has consisted in dividing the spectrum of emitted frequencies into frequency bands and in successively or simultaneously emitting said frequency bands, then processing the corresponding received signals in the manner described in the foregoing. However, this method is still subject to many disadvantages. In fact, since the amplitude spectra of the emitted signals do not in actual practice have perfectly adjacent square-wave shapes but exhibit considerable differences with respect to the square-wave shape as already mentioned, the sum of the amplitude spectra of the signals corresponding to the different bands is not equal to the amplitude spectrum of the entire spectrum of emitted frequencies.

Moreover, when the autocorrelations of these elementary signals corresponding to the frequency bands are performed, it is found that the sum of the autocorrelations is very different from the autocorrelation of the origin signal and especially that the sum correlation has a substantial correlation residue arising from the fact that the amplitude spectra of the elementary signals overlap with respect to each other.

Thus, if the conventional method is employed to perform the correlation of each recorded line or received signal with the emitted signal and then the summation of the lines corresponding to the different frequency passbands, there will again be found a seismogram equivalent to the pulsed seismogram convoluted by an autocorrelation having a substantial correlation residue. In consequence, certain horizons or reflectors of low energy will be disturbed or even destroyed by correlation residues or noises produced by higher-energy horizons located at some distance away.

Finally, it is known that different phenomena have the effect of attenuating the signals more or less selectively as a function of their frequency during emission of said signals, of their path within the medium to be explored and of their reception. Thus, at the time of emission by a vibrator which is capable of producing a number of frequencies, coupling of the vibrator with the surface layer of the medium to be explored or in other words the influence of said surface layer on which said vibrator rests on the emitted frequencies is such that the vibrator which is set at a low frequency such as 6 Hz, for example, emits at 6 Hz only to a limited extent but especially harmonics of this frequency such as 12 or 18 Hz, for example. As a result, this coupling limits the energy of the low-frequency signals and may therefore introduce errors in the corresponding signals received which are liable to be interpreted as being those produced by an emission of one of the harmonics of the low frequency. Moreover, there takes place a selective attenuation of the high frequencies by the medium to be explored as a result either of an effect of inelastic absorption of rocks or of the filtering action of geological series having thin-layered strata. In point of fact, both in regard to emission of low and high frequencies and in regard to reception of reflected waves, the conventional correlation method does not make it possible to dissociate the effects of coupling or of selective attenuation at high frequencies.

In seismic exploration as a whole, the high frequencies are those which are higher than 75 Hz.

The object of the present invention is to overcome the disadvantages mentioned in the foregoing and to propose a novel method of seismic exploration which makes it possible in accordance with the vibrational seismic technique to ensure that all the desired frequencies are received with the highest possible signal-to-noise ratio.

SUMMARY OF THE INVENTION

The invention has for its object a method which consists in emitting, in the medium to be explored by means of at least one emission source, vibrational acoustic signals of long duration at least at one emission point, the frequencies of the emitted signals being grouped together in bands comprised within a desired frequency spectrum, in receiving in at least one receiver the waves reflected by the different reflectors of the medium to be explored, in processing the received signals in order to determine the detected reflectors. In addition, the method essentially consists in forming the complex spectrum of the received signal corresponding to the signal emitted in respect of each band of frequencies, in forming the complex spectrum of a reference of the signal emitted in respect of each band of frequencies and in dividing the complex spectrum of the received signal by the complex spectrum of the reference of the emitted signal, at least an external portion of the band considered of the elementary complex spectrum resulting from the division being eliminated.

This makes it possible to modify the shape of the complex spectrum of the received signals in order to come as close as possible to the desired ideal shape.

BRIEF DESCRIPTION OF THE DRAWINGS

Further advantages and distinctive features of the present invention will be more clearly brought out by the description given hereunder by way of indication but not in any limiting sense, reference being made to the accompanying drawings, in which.

Figure 1:
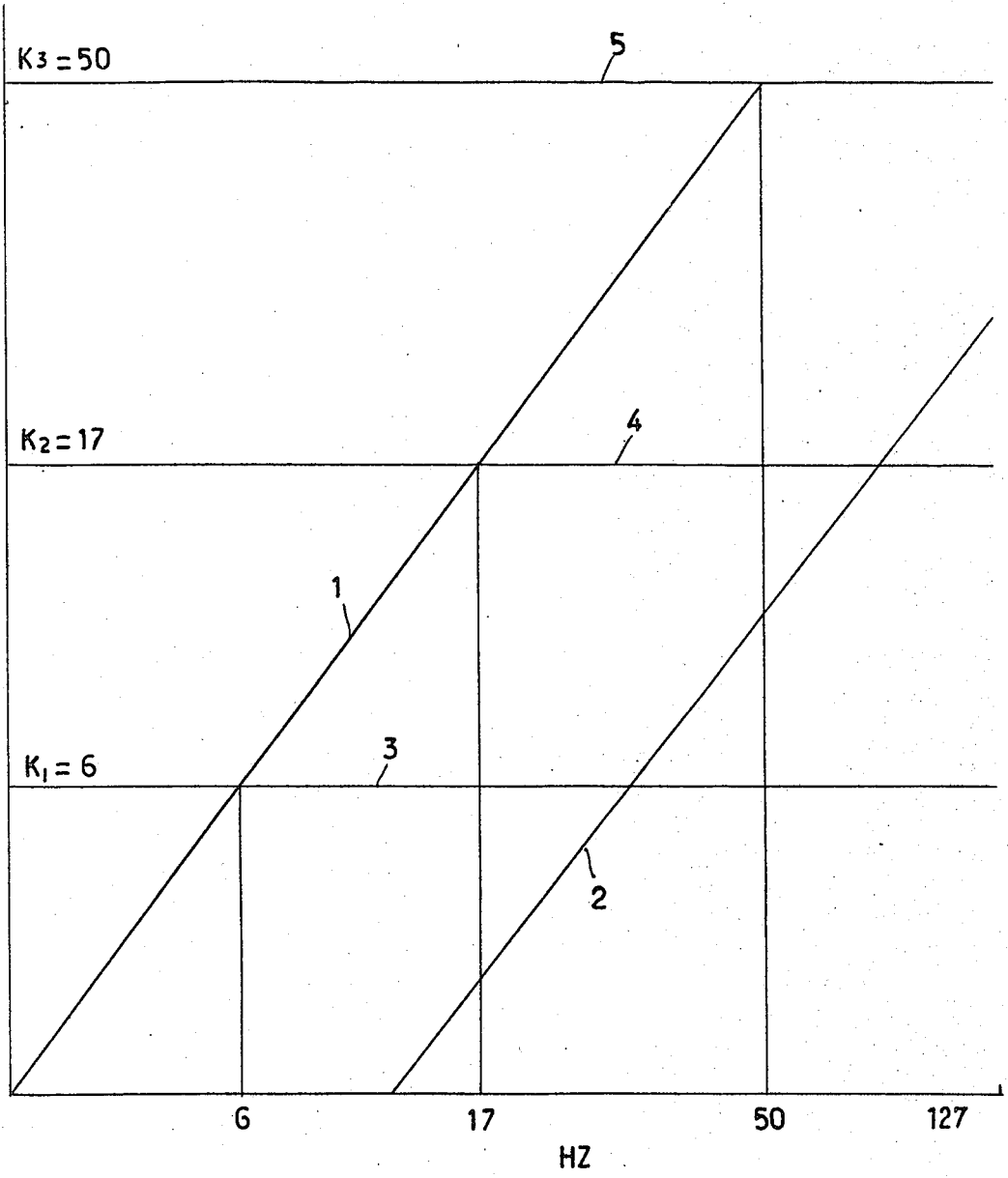
FIG. 1 shows the diagrams, on a logarithmic scale, of the apparent velocity of the organized sound and of the lowest apparent velocity of the reflected waves.

In accordance with the method of the present invention, the apparent velocity $V_B$ of noise in the medium to be explored is determined directly by conventional methods or alternatively with the aid of results of prior studies. The lowest apparent velocity $V_s$ of waves reflected within said medium to be explored is also determined as a function especially of the distance between the centroids of the emission system and of the receiving system. In the logarithmic scale, there are obtained the straight curves (1) and (2) of FIG. 1; the portion located above and to the left of the straight line (1) indicates the zone in which noise can appear whilst the portion located below the straight line (2) indicates the zone in which the received seismic signal is entirely located.

Thus, in the case of a medium to be explored, it has been found that $V_B = 1000$ m/s and $V_s = 5000$ m/s.

Depending on the performances of the vibrator, on prior knowledge of the medium to be explored which is capable of producing in particular $V_B$ and $V_s$ and on the depth to be reached, the limits $F_{max}$ and $F_{min}$ of the frequencies which it is desired to obtain are accordingly defined. In one example of execution, the following definitions are given: $F_{min} = 6$ Hz and $F_{max} = 127$ Hz. This spectrum of frequencies 6-127 Hz is then divided into a certain number of bands which is equal or substantially proximate to $$N = \left(\frac{F_{max}}{F_{min}}\right)^{\frac{C V_B}{V_s}}$$

where C is a coefficient which is higher than 1 and equal to 2, for example. With the numerical data recalled in the foregoing, it has been found that N was in the vicinity of 3. In all cases of execution, the number of bands adopted will be at least immediately below the number N which is found by application of the formula given above. The number of bands can be chosen between this lower limit and a higher value which can be very considerably in excess of the calculated value N.

Moreover, each band of frequencies within the desired spectrum of frequencies is chosen so as to ensure that the ratio of its highest frequency to its lowest frequency is equal or proximate to $V_s/(C \cdot V_B)$. In the example given above in which $V_s/(C \cdot V_B) \neq 3$, the minimum frequency $F_{min}$ of the desired spectrum is equal to the lowest frequency $f_i$ of the first band, for example 6 Hz. It accordingly follows that the highest frequency $f_s$ of this first band must be equal at a maximum to 6 Hz $\times V_s/(C \cdot V_B)$ namely approximately 18 Hz and preferably 17 Hz. By proceeding successively, it would be found that the second band is limited by the frequencies 17-50 Hz, the third band being limited by 50-127 Hz, this last value being equal to the maximum frequency $F_{max}$ of the desired spectrum.

Each of these frequency bands is emitted and recorded by means of one or a number of emission sources and one or a number of receivers. The arrangement of the emission sources and receivers in the vicinity of the free surface of the medium to be explored throughout the duration of the emission and reception is such that positioning of the emission points with respect to each other and of the receiving points with respect to each other is chosen in the case of each band of frequencies in such a manner as to ensure that the cutoff wave number resulting from the positioning mentioned above is equal to the ratio of the lowest frequency of the band considered to the apparent velocity of sound $V_B$.

The wave number filters employed are represented in FIG. 1 by the horizontal straight lines (3), (4), (5) which pass respectively through the logarithmic ordinates $K_1$, $K_2$, $K_3$. These filters permit full transmission below said straight lines and attenuate all frequency components located above these latter. However, these filters do not have an infinite slope and the attenuation becomes negligible only at a certain distance from the corresponding straight lines. In the case of the filter $K_1$, for example, said attenuation is negligible at about K1/2.

Thus, when cutting the desired spectrum of frequencies into bands, the limiting frequencies are chosen so as to ensure that, in a given band of frequencies, the limiting straight line (2) of the signal does not have any point higher than the horizontal straight line 3, 4 or 5 of the wave number filter which is chosen for this band of frequencies.

Moreover, it is preferable to ensure that said straight line (2) in each frequency band considered does not have any point which is higher than the straight lines parallel to the lines (3), (4) and (5) and having an ordinate which is respectively equal to $K_1/2$, $K_2/2$, $K_3/2$.

In the example chosen, there will again be given the different numerical values which satisfy the conditions set forth in the foregoing.

| 1st band | $f_i$ | = 6 Hz |
| | $f_1$ | = 17 Hz |
| | $K_1$ | = 6 cycles/km |
| cutoff wavelength | $L_1$ | = 166 m |
| 2nd band | $f_i$ | = 17 Hz |
| | $f_1$ | = 50 Hz |
| | $K_2$ | = 17 cycles/km |
| cutoff wavelength | $L_2$ | = 60 m |
| 3rd band | $f_i$ | = 50 Hz |
| | $f_1$ | = 127 Hz |
| | $K_3$ | = 50 cycles/km |
| cutoff wavelength | $L_3$ | = 20 m |

Figure 2:
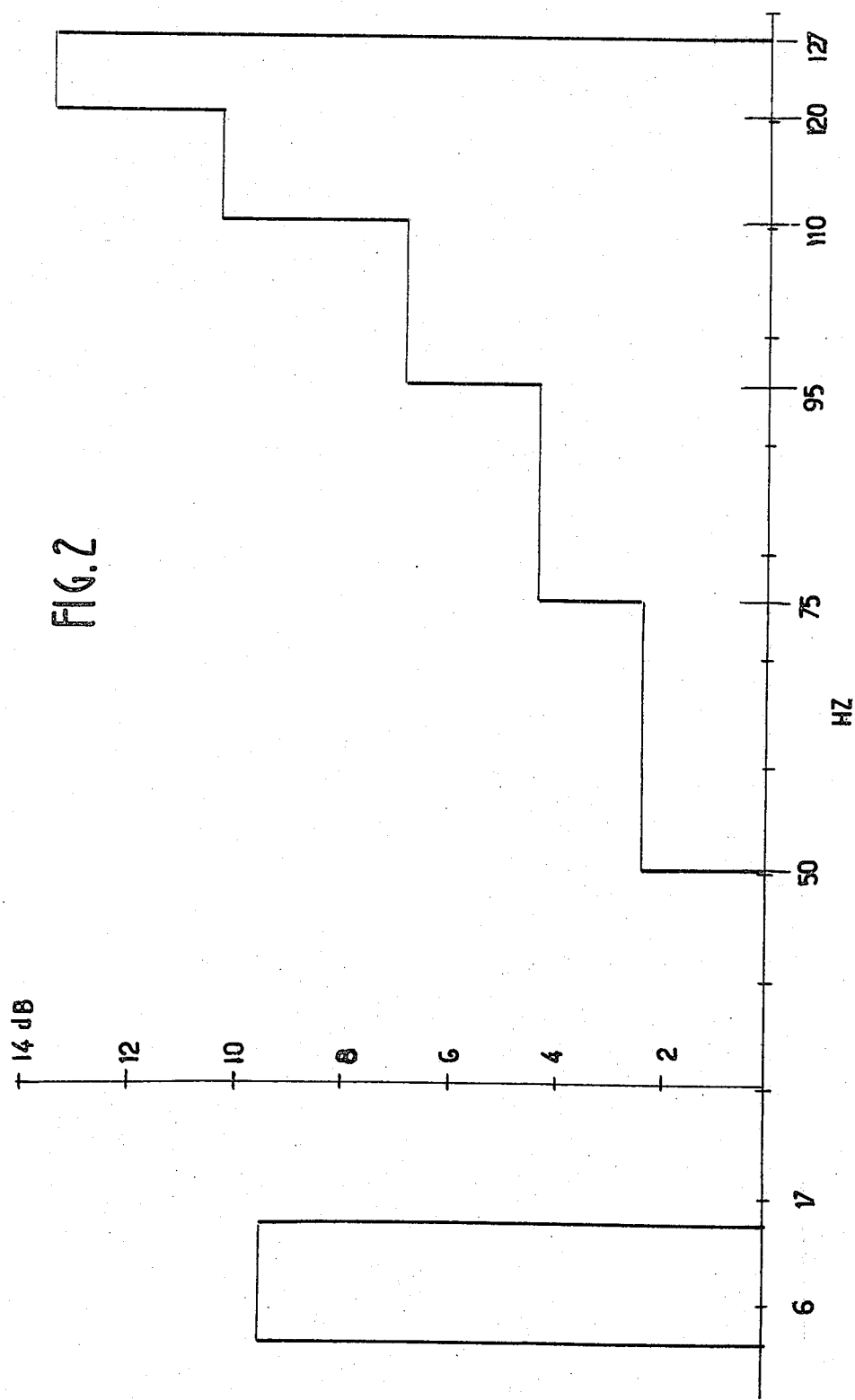
FIG. 2 is a diagram of the energy levels of the frequency bands and steps and of their distribution.

In order to ensure the emission of a sufficiently large quantity of high frequencies and to remove the problem of absorption of the medium to be explored, these high frequencies at the time of emission are reinforced in accordance with the invention by cutting the band or bands comprising high frequencies into a number of frequency steps, the width of which decreases progressively as the frequency increases (FIG. 2). Accordingly, if the periods of emission of the signals within each uncut band are equal to those of the signals corresponding to said frequency steps, there is in fact obtained a reinforcement of the emission of high frequencies.

In the example recalled earlier, the third band which comprises high frequencies has been cut into five frequency sub-bands as indicated hereunder:

| | $f_i$ in Hz | $f_s$ in Hz | $f_s-f_i$ (Hz) |
|---|---|---|---|
| 1st step | 50 | 75 | 25 |
| 2nd " | 75 | 95 | 20 |
| 3rd " | 95 | 110 | 15 |
| 4th " | 110 | 120 | 10 |
| 5th " | 120 | 127 | 7 |

It is observed in FIG. 2 that, compared with the second central band of 17–50 Hz serves as a reference since its frequencies do not present any major difficulties in regard to either emission or reception, the above-mentioned cutting-out operation results in progressive reinforcement of the high frequencies attaining 14 dB and in reinforcement of the low frequencies of approximately 10 dB, the reinforcement just mentioned being intended to improve the coupling between vibrator and medium to be explored at low frequencies.

The foregoing description brings out the fact that the frequency bands or steps are emitted one after the other in any order within the desired spectrum of frequencies, the time-distribution of emissions being effected in the most suitable manner as a function of the object sought. Moreover, the frequency bands or steps can be emitted with or without frequency overlap between two bands or in juxtaposed manner, that is, in succession without any frequency interval.

When it is desired to attenuate certain high frequencies, the frequency band or bands comprising said high frequencies can be cut into frequency sub-bands having a width which increases when the frequency increases.

When it is desired to give preference to or on the contrary to attenuate certain frequencies of the spectrum of emitted frequencies, the frequency band or bands comprising said frequencies are cut into frequency sub-bands which will be of small width or on the contrary of substantial width compared with the other frequency bands or steps.

In accordance with another important feature of the invention, processing of the signals received in the receivers is carried out in the following manner after having previously recorded a reference of the signals emitted in each frequency band or step.

The complex spectrum (amplitude and phase) of the reference of the emitted signal is formed or calculated in respect of each frequency band or step; the complex spectrum of the received signal (amplitude and phase) corresponding to said emitted signal is formed or calculated and the complex spectrum of the received signal is divided by the complex spectrum of the reference of the emitted signal in order to obtain an elementary complex spectrum, the division being performed over the frequency interval comprised within the frequency band or step considered. The amplitude of the elementary complex spectrum is preferably reduced to zero in at least one of the portions which are external to said interval.

This processing operation is preferably performed in the spectral domain by division but can also be carried out in the time domain by deconvolution. This arises from the fact that division in the spectral domain is equivalent to deconvolution in the time domain; transposition from the spectral domain to the time domain and conversely is carried out by means of the Fourier transform as is well known to those versed in the art.

In the spectral domain and in the case of each frequency band or step, the complex spectrum (amplitude and phase) of the reference of the emitted signal is calculated, whereupon a spectrum equal to the reciprocal of said spectrum within the range of frequencies of the signal is calculated, said reciprocal spectrum being made equal to zero outside said range of frequencies.

After recording and again in the case of each frequency band or step, the complex spectrum of received signals corresponding to the frequency band or step considered is calculated by means of the Fourier transform. Said complex spectrum is then multiplied by the reciprocal of the complex spectrum of the emitted signal which was previously calculated.

Figure 3:
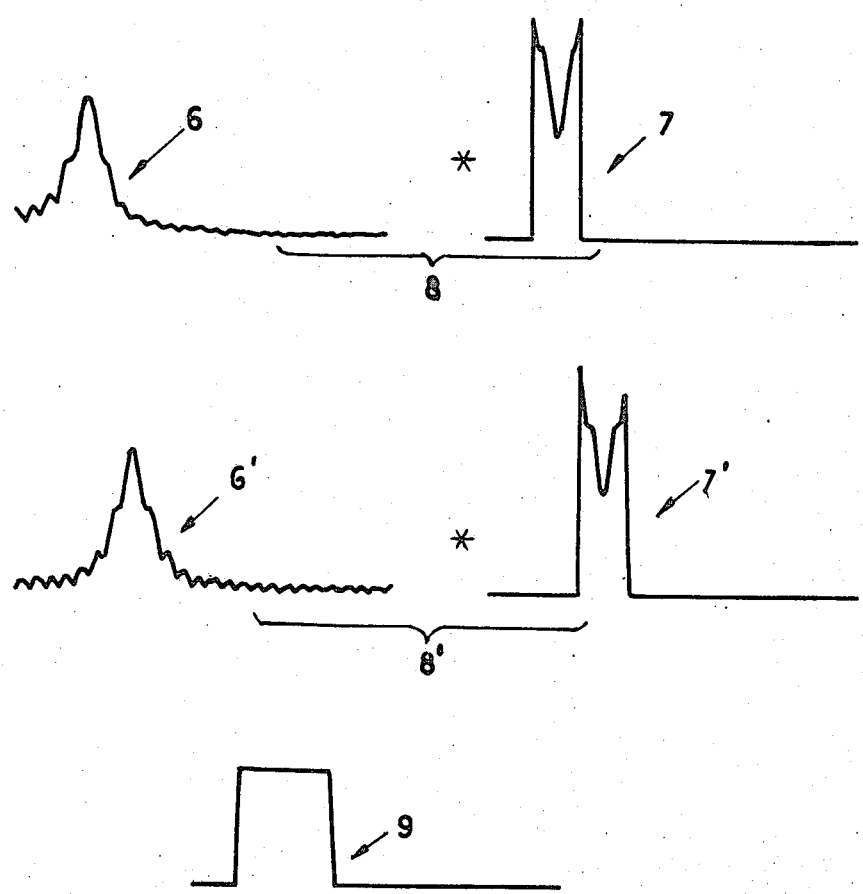
FIG. 3 is a diagrammatic representation of the processes in the spectral field.

This operation which is shown diagrammatically in FIG. 3 consists on the one hand in multiplying the amplitude spectrum (6) of the received signal by the reciprocal (7) of the amplitude spectrum of the emitted signal and on the other hand in adding the phase spectrum of the received signal with the phase spectrum of the reciprocal of the spectrum of the emitted signal. One reverts to the time domain by forming an inverse Fourier transform.

In the theoretical case of a single reflector, the operation involving multiplication of amplitude spectra in respect of a frequency band or step is represented in FIG. 3 by the bracket 8; another frequency band or step would be represented by graphs 6' and 7' and a multiplication operation 8'.

Figure 5:
FIG. 5 is the "signature" of the final seismogram obtained by the cross-correlation method.

One completion of these different operations involving determination of the elementary complex spectra, the sum of all the signals thus processed is formed in respect of all the frequency bands or steps, thus producing a total amplitude spectrum (9) which represents the amplitude spectrum of the final seismogram (FIG. 5) of the detected reflector.

Figure 4:
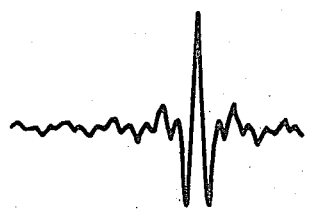
FIG. 4 is the "signature" of the prior art final seismogram corresponding to a single reflector.

The effect of the processing operation is therefore to obtain a "signature" (FIG. 5) which has distinctly less correlation noise than the signature obtained by means of the conventional method of correlation (FIG. 4).

Whatever method of processing is chosen (time or spectrum), it may sometimes prove necessary to perform the operation known to specialists as weighting. In accordance with the present invention, this weighting operation is performed with a view to compensating for differences in energy which may be observed in FIG. 2 and with a view to having a total spectrum which is as continuous as possible. This weighting operation can be applied both to the complex spectrum of received signals and to the elementary complex spectra or to the corresponding elementary time signals. Said operation consists in weighting prior to summing for example with a coefficient which is equal to the width of the band or step of frequencies of the emitted signal.

It should finally be noted that the complex total spectrum can be so arranged as to eliminate the parasitic information which is similar to the correlation noises.

Throughout the foregoing description, reference has been made to filtering in wave number which is specific to each band of frequencies, as performed by means of a relative arrangement of the sources or of the emission points with respect to each other and of the receivers or receiving points with respect to each other. The operation can also be performed by providing on the exploration site a number of wave-number filters which is smaller than the number of frequency bands, the other necessary cutoff wave numbers being obtained by a composition (already known per se) of recordings made at different receiving points from different emission points.

It can readily be understood that the present invention is not limited to the description given in the foregoing but extends on the contrary to all alternative forms of the method.

Thus it follows that one alternative embodiment consists in calculating, not a reciprocal of the complex spectrum of the emitted signal, but a waveform such that, once the product operation has been performed with the complex spectra of all the emitted signals, the total amplitude spectrum resulting from summation of the processed individual spectra has a suitable waveform for reducing the correlation noise such as, for example, a triangular waveform, a Gauss-curve waveform or the like which may prove to be more satisfactory than the square waveform.

We claim:

1. A method of improving the signal-to-noise ratio of a final seismogram in seismic exploration of a medium to be explored having different reflectors, said method comprising the steps of:
    (a) determining a maximum frequency to be emitted in a frequency spectrum for the medium to be explored;
    (b) determining a minimum frequency to be emitted in said frequency spectrum for the medium to be explored;
    (c) emitting, in said medium from at least one emission source, vibrational acoustic signals of long time-duration, the frequencies of said emitted signals being within said frequency spectrum, said frequency spectrum divided into a number of separate, contiguous, non-overlapping bands, each band having a different bandwidth than immediately adjacent bands, each bandwidth a function of the ratio $V_S/CV_B$, where said number of bands is at least equal to a whole number which is immediately below and closest to the value of the ratio $$N = \left(\frac{F_{max}}{F_{min}}\right) \frac{CV_B}{V_S}$$

where
    $F_{max}$ is the highest frequency of said desired spectrum,
    $F_{min}$ is the lowest frequency of said desired spectrum,
    C is a coefficient higher than 1 and dependent upon the cutoff of a wave-number filter,
    $V_B$ is the apparent velocity of sound within said medium, and
    $V_S$ is the lowest apparent velocity of waves reflected within said medium;
    (d) receiving, in at least on receiver, the waves reflected by the different reflectors of said medium, said receiver defining with said source emission, said wave number filter;
    (e) processing the received signals in order to determine the detected reflectors by (1) forming the complex spectrum for each band of frequencies of the received signal corresponding to the emitted signal, (2) forming the complex spectrum for each band of frequencies corresponding to a reference of the emitted signal, (3) dividing the complex spectrum of the received signal by the complex spectrum of the reference of the emitted signal to obtain an elementary complex spectrum for each band of frequencies, and (4) setting the amplitude of at least one portion of the elementary complex spectrum to zero if that portion is external to the band; and
    (f) producing a seismogram from said received processed signals in which, for each of said frequency bands, an improved signal-to-noise ratio is obtained, whereby said final seismogram has an improved signal-to-noise ratio.

2. A method according to claim 1, wherein for each band of frequencies, the received signal is attenuated by wave-number filtering in which the cutoff wave-number is equal to the ratio of the lowest frequency of the band considered to the apparent velocity of noise $V_B$.

3. A method according to claim 1, wherein the elementary complex spectra of all the bands obtained after division are added so as to form a total complex spectrum, the inverse Fourier transform being then applied to said total complex spectrum in order to obtain the final seismogram of all the detected reflectors.

4. A method according to claim 1, wherein each elementary complex spectrum is converted to an elementary time signal by forming an inverse Fourier transform, said elementary time signals being then added in order to obtain the final seismogram of all the detected reflectors.

5. A method according to claim 1 wherein, in the case of each band of frequencies, the received signals or their complex spectrum are weighted prior to division in order to obtain subsequently a continuous total complex spectrum.

6. A method according to claim 1, wherein at least part of the wave-number filters required are obtained by composition of the recordings made at different receiving points from different emission points.

7. A method according to claim 1 wherein, in the case of each band of frequencies, wave-number filtering is performed solely by means of relative positioning of the emission points with respect to each other and of the receiving points with respect to each other.

8. A method according to claim 1, wherein the ratio of the highest frequency to the lowest frequency of each frequency band is in the vicinity of $V_s/CV_B$.

9. A method according to claim 8, wherein the bands in which the lowest frequency is higher than 50 Hz can be divided into frequency sub-bands.

10. A method according to claim 8 wherein, in each band which is divided into sub-bands, the width of the successive sub-bands decreases when the frequency increases.

11. A method according to claim 8 wherein, in each band which is divided into sub-bands, the width of the successive steps increases when the frequency increases.

12. A method according to claim 9, wherein the frequency bands or sub-bands are emitted one after the other within the desired spectrum of frequencies.

13. A method according to claim 9, wherein the frequency bands or sub-bands are emitted without any overlap with respect to each other within the desired spectrum of frequencies.

14. A method according to claim 13, wherein the frequency bands or sub-bands are juxtaposed.

15. A method according to claim 9, wherein the periods of emission of each frequency band or sub-band are equal.

16. A method according to claim 9, wherein the received signals corresponding to the signals emitted within each of the frequency sub-bands are processed in the same manner as the received signals corresponding to the signals emitted within each of the other non-divided bands.

* * * * *